March 4, 1952 C. B. AIKEN 2,587,674

BOLOMETER

Filed April 13, 1950

INVENTOR.
CHARLES B. AIKEN
BY Wade Koontz
ATTORNEY and
James S. Shannon
AGENT

Patented Mar. 4, 1952

2,587,674

UNITED STATES PATENT OFFICE 2,587,674

BOLOMETER

Charles B. Aiken, Wilton, Conn., assignor to the United States of America as represented by the Secretary of the Air Force Application April 13, 1950, Serial No. 155,731

4 Claims. (Cl. 201—63)

The present invention relates to thermal responsive devices and more particularly to new and improved bolometers for detaching radiant energy in the infra-red region, the intensity of which varies periodically at a relatively low rate, although they are not limited to such use.

The bolometers used, heretofore, for detecting radiant energy have comprised, generally, a narrow, thin strip of metal deposited on a film of insulating material and enclosed in an envelope containing hydrogen at a very low pressure. Bolometers of this type, when carefully made, have good sensitivity and low-frequency response. It has been found, however, that leakage of minute quantities of air into the envelope, or outgassing from the elements contained therein, can produce a marked reduction in the cooling effect of the hydrogen, resulting in an increased sensitivity and bad distortion of the frequency characteristic. The reduction in the cooling effect of the hydrogen may in some cases be sufficient to cause the bolometer elements to overheat and burn out even at normal operating currents.

The principal object of the invention, accordingly, is to provide bolometers responsive to infra-red radiant energy of varying intensity that are free from the above-noted deficiencies of prior art devices, and which are simple, rugged and easy to construct.

Another object of the invention is to provide new and improved bolometers of the above character in which the envelope contains air or an inert gas instead of hydrogen and in which the gas pressure is appreciably greater than the pressure generally used in hydrogen bolometers.

A further object of the invention is to provide new and improved bolometers of the above character in which the cooling effect of the structural elements is increased relatively to the cooling effect of the gas, whereby dependence of the frequency response on the cooling effect of the gas may be reduced.

The objects of the invention are attained in a bolometer having a blackened metal film deposited on an insulating film by disposing a polished cooling plate in heat conducting relation to the metal and insulating films, and by introducing into the bolometer envelope air or an inert gas at a suitable pressure. With the proper spacing between the cooling plate and the metal and heat insulating films and with a suitable gas pressure a bolometer having good sensitivity and low-frequency response can be obtained.

The polished cooling plate reflects most of the energy passing through the transparent insulating film and the blackened metal film deposited thereon which is so thin that it transmits a substantial fraction of the total received energy. By reflecting this transmitted energy back for a second passage through the metal film and blackening material a larger portion is absorbed and the efficiency is thereby raised. Moreover, it provides a conductive cooling effect which is substantially independent of frequency, up to a certain point, so that a better frequency characteristic results than could be obtained with air at atmospheric pressure and no cooling plate. It also tends to reduce mass motion of the gas immediately surrounding the metal strip, thus reducing microphonic disturbances that might otherwise be produced.

The invention may be better understood from the following detailed description of several representative embodiments, taken in conjunction with the accompanying drawings in which.

Figures 1, 2, 3, 4, 5, 6, 7, 8:
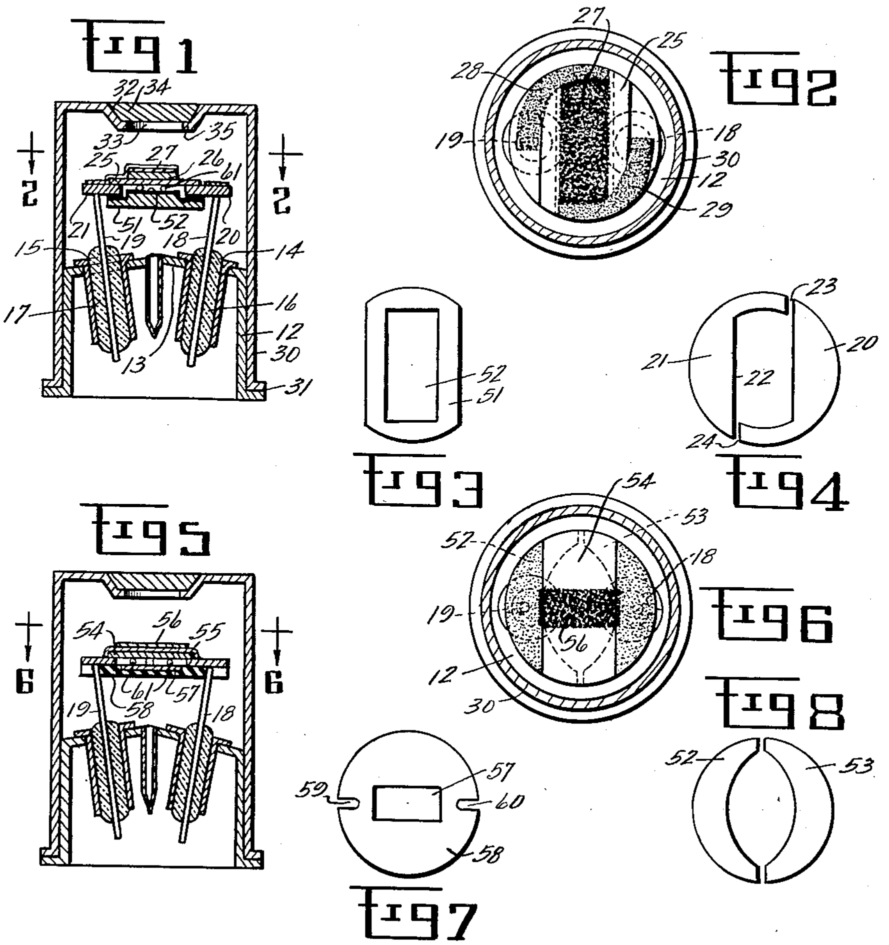
Fig. 1 is a view in longitudinal section illustrating a bolometer constructed according to the present invention.
Fig. 2 is a view in transverse section taken along line 2—2 of Fig. 1, looking in the direction of the arrows and showing the metal and plastic films together with the electrode structure.
Fig. 3 is a detailed view showing a metal cooling plate used in the bolometer illustrated in Fig. 1.
Fig. 4 is a detailed view showing the structure of the electrodes employed in the bolometer illustrated in Fig. 1.
Fig. 5 is a view in longitudinal section showing the details of a modified form of bolometer constructed according to the invention.
Fig. 6 is a view in transverse section taken along line 6—6 of Fig. 5, looking in the direction of the arrows.
Fig. 7 is a detailed view of a cooling plate assembly used in the bolometer of Fig. 5.
Fig. 8 is a detailed view showing the electrode structure of the bolometer in Fig. 5.

Referring now to Fig. 1, the bolometer comprises a lower cylindrical base member 12 which is open at the bottom and which has an upper transverse partition 13 in which are formed a pair of spaced-apart apertures 14 and 15. Secured within the apertures 14 and 15, respectively, are a pair of conventional insulating beads 16 and 17, respectively, carrying conducting supports 18 and 19, respectively. Mounted at the upper ends of the supports 18 and 19 are a pair of electrodes 20 and 21, respectively, which may be shaped as shown in Fig. 4 to form a circular disk having a substantially rectangular aperture 21 in the center thereof, and which are separated by short gaps 23 and 24.

Formed on the electrodes 20 and 21 and covering the aperture 22 is a plastic film 25 on which formed a narrow metal strip 26, the upper surface of which is preferably blackened at 27 by evaporating gold thereon under a low pressure in the manner disclosed in the co-pending application of William H. Carter, Jr., filed March 23, 1946, Serial No. 656,640, now Patent No. 2,562,770, issued July 31, 1951. The ends of the metal strip 26 are electrically connected to the conducting segments 28 and 29 (Fig. 2) which may be of gold deposited on the electrodes 21 and 20 as shown and in a manner to be explained later.

Secured beneath the electrodes 20 and 21 by a suitable insulating cement and spaced a short distance therefrom, is a cooling plate 51 made of copper or tin-plated iron, for example, and having a central, polished raised portion 52. The raised portion 52 should preferably have substantially the same dimensions as the metal strip 26 and its upper face should be located a predetermined, short distance below the metal strip 26, as described in greater detail hereinafter.

The base member 12 is mounted within a cylindrical envelope 30 which may be secured to the lower base member 12 at the lower end thereof in any suitable manner as by a low temperature solder 31, for example, in such fashion as to form an air-tight joint. In the upper wall of the cylindrical envelope 30 is formed an inwardly dished portion 32 in the bottom of which is formed an aperture 33 communicating with the interior of the bolometer. Fitted within the inwardly dished portion 32 is a window 34 made of a material that is transparent to infra-red radiation such as sodium chloride or silver chloride, for example. The window 34 may be tightly cemented in the inwardly dished portion 32 by a small quantity of fused material 35 which may be the same as the material comprising the window 34.

The plastic film 25 may be made of any suitable cellulosic material than can be mounted on the electrodes 20 and 21 in the form of a thin film. A film solution suitable for this purpose may be made by dissolving approximately 5 feet of Ansco supreme, 35 mm. panchromatic, nitrate base film in 350 cc. of a suitable solvent such as amyl acetate, for example. The sensitized emulsion is first removed in any suitable manner as by immersing the film in boiling water, for example, until the sensitized emulsion has been completely dissolved. It is then washed thoroughly in water and dried with a cloth, following which it should be dried in air for a period of approximately 15 minutes. The strip of film is then preferably cut into 1 inch lengths and immersed in a solution of amyl acetate for a period of approximately 2 hours, after which is is stirred in order to insure complete solution of the film. The film solution is then filtered in any suitable manner, as through a clean, cotton cloth, for example, to remove any gelatin and dirt that may be present and amyl acetate is added to replace any loss through evaporation and to bring the volume of the solution up to 350 cc.

In order to form the film 25 on the electrodes 20 and 21, the bolometer subassembly comprising the lower base member 12, the insulating beads 16 and 17, supporting rods 18 and 19, and electrodes 20 and 21 may be immersed in a container of water such that the electrodes 20 and 21 lie a short distance below the water surface. A small quantity, preferably only a few drops of the cellulose nitrate solution prepared as described above is deposited on the water surface in any convenient manner such as by means of a medicine dropper. In this fashion, a film of cellulose nitrate approximately 0.8 to 0.14 microns thick is formed on the water surface. When this film has hardened somewhat, the water is slowly siphoned out of the container in such fashion that the film settles on the electrodes 20 and 21; the excess cellulose is cut away and the mounted films are then baked for a period of approximately two hours at a temperature in the range from 140° to 145° F.

The cellulosic material is then removed from the portions of the electrodes 20 and 21 on which the conducting segments 28 and 29 are to be formed so as to expose a clean surface on which a metal such as gold, bismuth or zinc, for example, can be deposited by evaporation. Masks are then fitted over the electrodes 20 and 21 so that portions corresponding to the areas 28 and 29 in Fig. 2 are exposed while the rest of the surface is covered. A suitable metal, preferably gold, is then evaporated on the exposed areas 28 and 29 as described in greater detail below.

Figure 11:
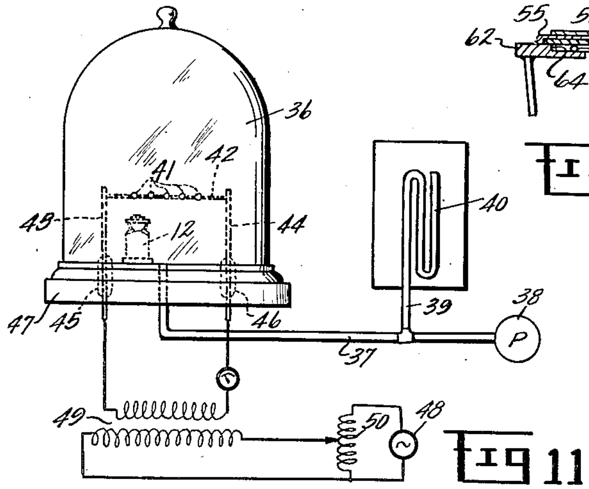
Fig. 11 is a schematic diagram illustrating apparatus for forming the metal strip of a bolometer in accordance with the invention.

The evaporation of gold on the electrodes may be accomplished by means of the apparatus shown in Fig. 11. In Fig. 11 is shown a vacuum chamber 36 such as a bell jar, for example, from which air is evacuated through conduit 37 by means of a suitable pump 38. The conduit 37 has a branch 39 communicating with a suitable pressure gauge 40 by means of which the pressure within the bell jar 36 may be measured. The gold to be used in the evaporation process is fused in a series of droplets 41 on a tungsten wire or filament 42 which is connected at its opposite ends to the posts 43 and 44 formed of brass or other suitable conducting material.

The posts 43 and 44 are mounted in insulators 45 and 46 sealed in the base 47 of the bell jar 36 and are connected with a suitable source of electrical energy. The source of electrical energy may be a battery or, as illustrated, an alternating current generator 48 which is connected through a transformer 49 to the posts 43 and 44. A potentiometer or a variable ratio transformer 50 is connected between the generator and the transformer 49 in order to regulate the current supply in the filament 42.

The electrode assembly with the plastic film 25 formed thereon is placed within the bell jar 36, which is then evacuated to a pressure in the range of $10^{-5}$ to $10^{-6}$ mm. of mercury and electric current is passed through the filament 42 to evaporate gold from the droplets 41 on to the unmasked areas of the electrodes 20 and 21. A satisfactory deposit can be obtained in about 30 seconds by passing 13 amperes through a .020 diameter tungsten filament 42 having 7 droplets of gold thereon, the total weight being approximately ½ dwt.

The electrode assembly is then removed from the bell jar 36 and the electrode masks are removed and replaced with other masks shaped to leave a central strip having the same width as the desired width of the metal strip 26 and sufficiently long to overlap the electrode gold deposit. The electrode assembly is then replaced in the bell jar 36 and the pressure is again reduced to the range from $10^{-5}$ to $10^{-6}$ mm. of mercury, whereupon gold is evaporated from the filament 42 to form the metal strip 26. If the diameter of the tungsten filament 42 is 0.020 inch, a satisfactory deposit can be obtained with a current of 13 amperes and gold droplets totalling ½ dwt. in weight in from 3 to 15 seconds. For a strip approximately 5 x 5.5 mm., the resistance of the deposited gold will generally lie in the range of from 50 to 75 ohms.

After the strip 26 has been deposited as described above, the electrode assembly is removed from the bell jar 36, the strip mask is removed and the electrode masks are replaced. The electrode assembly is then placed in the bell jar 36 and gold is again evaporated on the electrode areas 28 and 29 in Fig. 2 under the same conditions and in the same manner as described above. It has been found that this second electrode deposit lowers the resistance of the unit and improves the yield of quiet and sensitive units.

After the gold electrode area has been properly deposited, the electrode assembly is removed from the bell jar 36 and the electrode masks are taken off and replaced by the strip masks preparatory to the deposition of the gold blackening layer 27. As described in the aforementioned copending application, Serial No. 656,640, the electrode assembly with the metal strip masks in place is placed under the bell jar 36 which is then evacuated by means of the pump 38 to a pressure of about .05 mm. of mercury or less. A dry, inert or inactive gas such as nitrogen, helium, argon or neon is then admitted into the bell jar until the pressure lies within the range from 2 to 12 mm. of mercury. Current is then passed through the tungsten filament 42 until large quantities of black or orange-black vapor or fog begin to come from the gold drops on the filament, thus forming the gold black layer 27 on the metal strip 26. After removal from the bell jar the electrode assembly is then preferably aged by dissipating approximately 50 milliwatts of electrical energy in the metal strip 26 for a period of from 2 to 3 hours.

It has been observed that the resistance of the electrode assembly drops substantially after the second electrode deposit is put on and that there is a further drop after the latter has been removed from the bell jar 36. The aging process referred to above also produces a further reduction in resistance. For these reasons, it is desirable to terminate the evaporation of gold during the formation of the metal strip 26 when the electrical resistance measured between the rods 18 and 19 while the electrode assembly is in the bell jar 36 is approximately twice the final resistance desired for the bolometer.

When the plastic film 25, the metal strip 26 and the gold black layer 27 have been formed on the electrode assembly and after the electrode assembly has been aged as described above, it may be sealed within the cylindrical envelope 30. This may be accomplished by sliding the lower base member 12 within the cylindrical envelope 30 and sealing off the bottom joint by low temperature solder as at 31, or in any other suitable manner. The completed assembly is then placed in an open-sided oven and baked for a period of from 2 to 3 hours at a temperature from 140° to 145° F. while under the vacuum provided by a rotary pump. At the end of the baking operation, a dry, inactive or inert gas such as nitrogen, argon or neon, for example, is admitted to the bolometer to an excess pressure and is then pumped down to a suitable pressure which may lie within the range of 2 mm. to 760 mm. of mercury. The bolometer is then sealed off in the conventional manner to prevent leakage of atmospheric air into the interior thereof.

In order to insure a satisfactory sensitivity and frequency characteristic, it is essential that the proper spacing be maintained between the raised portion 52 of the cooling plate 51 and the metal strip 26. It can be shown that if sinusoidally varying infra-red radiation impinges upon the metal strip 26, the amplitude of the temperature wave transmitted in the medium in a direction perpendicular to the face of the metal strip 26 will be reduced to 4.32% of its initial value in a distance of ½ wave length, so that events occurring at greater distances from the surface of the strip 26 are of no practical interest. If the cooling plate 51 is spaced from the strip by only 0.2λ a thermal wave must travel a distance of 0.4λ in going from the strip 26 to the raised portion of the plate 51 and back, and the over-all attenuation will reduce the amplitude of the reflected wave to approximately 0.081 of the original temperature varaition of the strip. Hence, if the effect of the gas and plate on the strip 26 is to differ markedly from that of the gas alone, the raised portion 52 of the plate 51 must be maintained within .2λ of the strip. As a practical matter it can be shown that in order to obtain a frequency characteristic which is reasonably independent of frequency, the spacing should be of the order of 0.1 to 0.3 mm. Glass fiber or fibers 61 may be used to maintain this spacing if desired.

In the embodiment illustrated in Figs. 5–8 inclusive of the drawings, a pair of crescent-shaped electrodes 52 and 53 are secured to the rods 18 and 19 and a plastic film 54 is formed on them as shown in Fig. 6. A metal strip 55 having a layer of black gold 56 thereon, which may be applied to the plastic film in the same manner as strip 26 and layer 27 of Fig. 1, extends between the electrodes 52 and 53. In this embodiment, a cooling plate 57 is imbedded in a disk 58 of electrical insulating material such as a polystyrene, for example. The disk 58 is provided with opposite U-shaped slots 59 and 60 to accommodate the rods 18 and 19 and is cemented to the lower surface of the electrodes 52 and 53 such that the cooling plate 57 lies directly below the metal strip 55. If desired, one or more glass fibers 61 may be disposed between the plastic film 54 and the cooling plate 57 as shown in Fig. 1, in order to support the film 54.

Figure 9:
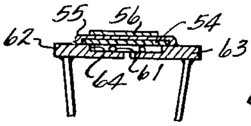
Fig. 9 is a partial view in longitudinal section illustrating another embobiment of the invention.
Figure 10:
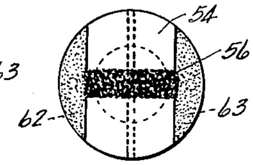
Fig. 10 is a top view of the embodiment shown in Fig. 9.

If desired, heavy metal electrodes 62 and 63 may be provided having a centrally located recess 64 formed in the upper face thereof, as shown in Fig. 9. In this embodiment, the central portions of the electrodes 62 and 63 forming the bottom of the recess 64 serve as the cooling plate, and the depth of the recess 64 is made equal to the desired spacing between the plastic film 54 and the cooling plate.

Bolometers of the type described above are especially useful for detecting radiant energy in the infra-red region, the intensity of which varies periodically at a relatively low frequency, say 50 cycles per second or less. By controlling the gas content, the gas pressure and the spacing between the cooling plate and the conducting metal strip, a relatively wide variety of frequency response characteristics may be obtained. For optimum operation at a fixed frequency, with the maximum safe current flowing in the strip, a bolometer should preferably be designed so that its frequency characteristic drops by approximately 3 db at the operating frequency.

It will be apparent to those skilled in the art that the above-described bolometer apparatus and processes by which it is made may be modified in a number of respects within the scope of the invention. For example, several alternate methods of depositing the gold on the electrodes and forming the metal strip may be used. If desired, the metal strip may be deposited first and a layer of gold may be deposited over it above the electrodes, or the second deposit of gold on the electrodes in the preferred method described herein may be omitted.

Instead of the specific film solution described above, other cellulosic materials capable of forming thin films may be used. Agfa Ansco No. 353-330-25 nitrate film dissolved in amyl acetate or any other suitable solvent may be used. The emulsion can be left on the film if desired, and filtered out of the solution. A mixture of one part Duco cement and three parts Duco thinner No. 3614 G also makes a usable film solution. Other suitable cellulosic materials will suggest themselves to those skilled in the art.

From the foregoing, it will be understood that the invention provides new and improved bolometers which have good sensitivity and low frequency response. By utilizing a cooling plate located a suitable distance behind the metal heat responsive strip, an inert gas at a pressure substantially higher than is used in hydrogen filled bolometers may be employed. Bolometers constructed in this fashion are much less influenced by leakage of atmospheric air into the envelope or by outgassing from the elements contained within the envelope.

While several representative embodiments have been described herein, invention is not to be limited in any way thereby but is susceptible of numerous changes in form and detail within the scope of the appended claims.

What I claim is:

1. In a bolometer, the combination of a sealed, metal, tubular envelope containing a gas and having a window capable of transmitting radiant energy in the infra-red region therethrough, a pair of insulating beads mounted in said envelope and carrying a pair of longitudinally extending conducting rods, said conducting rods providing electrical communication between the interior and exterior of said envelope, a pair of flat electrodes rigidly secured to said conducting rods, said electrodes having cooperating spaced-apart portions lying in a plane substantially perpendicular to the longitudinal axis of said envelope and forming a ring-like support, a plastic film carried by said support, a thin, blackened metal strip on said film and electrically connected to said electrodes, and a polished cooling plate supported in close proximity to said metal strip on the side thereof opposite to that from which radiation is received.

2. A bolometer comprising a sealed, metal tubular envelope containing nitrogen at a pressure in the range from about 2 mm. to 760 mm. of mercury and having a window capable of transmitting radiant energy in the infra-red region therethrough, a pair of insulating beads mounted in said envelope and carrying a pair of longitudinally extending conducting rods, said conducting rods providing electrical communication between the interior and exterior of said envelope, a pair of flat electrodes rigidly secured to said conducting rods, said electrodes having cooperating, spaced apart portions lying in a plane substantially perpendicular to the longitudinal axis of said envelope and forming a ring-like support, a plastic film carried by said support, a thin, blackened, metal strip on said film and electrically connected to said electrodes, and a cooling plate positioned on the side of said metal strip opposite that from which radiation is received and having a polished, raised portion lying beneath and in close proximity to said metal strip.

3. A bolometer comprising a sealed, metal tubular envelope containing nitrogen at a pressure in the range from about 2 mm. to 760 mm. of mercury and having a window capable of transmitting radiant energy in the infra-red region therethrough, a pair of insulating beads mounted in said envelope and carrying a pair of longitudinally extending conducting rods, said conducting rods providing electrical communication between the interior and exterior of said envelope, a pair of flat electrodes rigidly secured to said conducting rods, said electrodes having cooperating, spaced-apart portions lying in a plane substantially perpendicular to the longitudinal axis of said envelope and forming a ring-like support, a plastic film carried by said support, a thin, blackened, metal strip on said film and electrically connected to said electrodes, an insulating plate supported beneath said electrodes, and a polished, metal plate imbedded in said insulating plate, said metal plate lying in close proximity to said metal strip on the side thereof opposite to that from which radiation is received.

4. A bolometer comprising a sealed, metal tubular envelope containing nitrogen at a pressure in the range from about 2 mm. to 760 mm. of mercury and having a window capable of transmitting radiant energy in the infra-red region therethrough, a pair of insulating beads mounted in said envelope and carrying a pair of longitudinally extending conducting rods, said conducting rods providing electrical communication between the interior and exterior of said envelope, a pair of flat, semi-circular electrodes rigidly secured to said conducting rods, said electrodes lying slightly spaced apart in a plane substantially perpendicular to the longitudinal axis of said envelope and forming a disc-like support, means forming adjacent recessed portions in said electrodes between said conducting rods, a plastic film carried by said electrodes and lying over the adjacent recessed portions thereof, and a thin, blackened metal strip on said film and electrically connected to said electrodes, the bottom walls of the adjacent recessed portions in said electrodes cooperating to form a cooling plate in close proximity to said metal strip on the side thereof opposite to that from which radiation is received.

CHARLES B. AIKEN.

REFERENCES CITED

The following references are of record in the file of this patent:

UNITED STATES PATENTS

| Number | Name | Date |
|---|---|---|
| 1,381,474 | Kunz | June 14, 1921 |
| 1,807,056 | Zworykin | May 26, 1931 |
| 1,899,026 | Fessenden | Feb. 28, 1933 |
| 2,402,662 | Ohl | June 25, 1946 |
| 2,448,518 | Cashman | Sept. 7, 1948 |